(12) United States Patent
Gray

(10) Patent No.: X8693
(45) Date of Patent: Mar. 18, 1835

(54) OINTMENT, CURE OF DISEASES

(76) Inventor: William Waller Gray

William Walker Gray of Richmond Virginia

Letters Patent dated March 18th 1835.

The Schedule referred to in these Letters Patent and making part of the same containing a description in the words of the said William Walker Gray him self of his improvement in an ointment for the cure of many external diseases To all whom these presents shall come. Be it known that I William Walker Gray of the City of Richmond in the County of Henrico and State of Virginia have invented a new and useful improvement in an ointment for the Cure of many external diseases Viz White Swellings. Ulcers of long standing. Tumors Eruptions Burns & scalds. old and fresh wounds Calous and Glandular Swellings &c. &c. and that the following is a full and exact description of the construction and operation of said Ointment as invented or improved by me.

Receipt and mode of preparing the Ointment.

One Gallon Cotton seed Oil. one Gallon Linseed oil. one quart of sweet oil pure. One quart Canada Balsam or oil of Fir two pounds of Mutton suet. one pound Bees wax and five pounds Sugar of Lead. The cotton seed and linseed oils to be put into an iron kettle sufficiently large to hold 14 or 15 gallons the kettle to be swung on a crane over a fire of charcoal in a composition or other furnace the heat of which may be regulated by hoisting or shutting down the drawer. The oils should be slowly boiled or simmered for five or six hours. but never so much heated as to burn or destroy the gummy substances. Previous to introducing the sugar of lead however, the heat of the oils should be considerably increased until it will scorch and blacken the feather or parchment end the end of a common goose quill very quickly. In this stage of the oil the lead may be introduced after being fined ground in a mortar of some kind as fine as flour if possible. and then passed through a fine hair sieve One person should stir the oils while another should throw in the lead in small quantities through a tin pot made like a pepper pot. after the lead is introduced, (which should require at least one hour) the
mallow seed and Beeswax must be put in and the stirring continued over
a moderate fire one half hour longer. When the heat is great and the lead
introduced it is sometimes difficult to keep the oils within the kettle
therefore by means of a crane the kettle may be very promptly removed from
the fire, and if necessary the oils may be dipped out with an iron la-
dle and put into large earthen or crockery pans and when the heat dimin-
ishes or agitation subsides the oils from the pans may be returned to the
kettle. and the stirring continued until the process is completed.
After this work is done take the kettle down, let the materials get
somewhat cool, and then pour the sweet oil and Canada Balsum
(mixed together) into the ointment taking care not to let the heat be so great
as to make these last mentioned ingredients evaporate. This completes
the whole process. the ointment should then be dipped out of the kettle
strained through a fine wire sifter into crockery or fire proof pans and
there remain until the day following. when it may be warmed and made
sufficiently thin to be put into pots by means of a tin cup with a lip
or spout. The pots should be well corked and sealed or the ointment
will work out through every aperture. The cork should never penetrate
the mouth of the pot so far as to touch or press upon the ointment.
The tin pot mentioned above should be made large enough to contain a pint
and the holes in the top made as small as that of a pepper pot.
Mode of applying the ointment. For an Ulcer. Tumor. Burn or Erup-
tion that discharges much matter. apply fresh ointment on oiled linen
or cotton once in 24 Hours. but is frequently necessary in such cases
to remove the plaster in the course of the day and wipe away the matter
drawn to the surface by the active operations of the ointment. for which pur-
pose a soft dry linen or cotton rag must be used. taking care at the
same time not to wash or use water about the wound in any manner
in order to keep it equally under the influence of the ointment.
The discharge of matter from a corrupt wound of long standing is gen-
erally very dark at first and in some cases of this kind it may be advisa-
ble to apply fresh ointment twice a day say morning and night in order to expedite the work of cleansing as well as to subdue the inflamation and prevent mortification. When the affected part is thoroughly drain ed, a disposition to heal is generally manifested by a discharge of white healthy matter. the edges becoming flat and white and the centre filling up with small red pimples of sound flesh. In this stage of the wound apply the ointment once in 48 Hours and cleanse once in 24 as above directed. In Ulcers produced by mercury the Sarsaparilla drink should also be used in order to create a free discharge of the poisonous matter. This drink can be procured of the druggists generally. For inflamations swellings fresh wounds sprains or burns, once in 24 Hours will be often enough to apply the ointment. If applied to the sore breast of a female it can be rendered more mild if necessary by spreading a small quantity of mutton suet on each plaster and mixing it well by heating. The ma terials being of the purest kind no injury whatever can arise from the use of this ointment; nor can there be the least liability to cold at any season; In relation to long standing and deeply corrupted sores of any kind I particularly recommend. that the plaster be spread large enough to cover the whole inflamed part. in fact should the wound be situated about the middle of the leg then wrap the same in ointment from the knee to the foot until the inflamation be completely subdued, and should mortifica tion be apprehended let the plaster be made warm in order that its effect may be rendered more active and powerful. In the snake bite this course is strenuously urged taking care first to scarify the neighbourhood of the part bitten. The spider bite if not early treated will extend to the bone form a core and sometimes produce deep ulceration. For soreness about the breast spread a plaster large enough to cover the whole chest also apply one between the shoulders. The ointment is an excellent dressing to follow a blister in order to create a suppuration and thereby more effectually relieve the part affected by pain particularly in cases of Pleurisy. some cases of Ul cer and Scrofula Tumor will require the ointment for months perhaps before a thorough cleansing can be effected. Therefore patience and perse verance must be exercised with great regularity in the dressings while strict attention should be paid to diet in order to prevent the system from

United States Patent

Patent No.: X8693

[illegible] very gross. This Ointment possesses three very desirable properties, Viz. It subdues the inflamation, causes a free discharge of the corrupt matter and creates a healing of the affected part at the same time. while it is extremely mild in its operation. In early stages of inflammatory rheumatism, soreness produced by cold (cramp cholic) about the breast from my own experience, this article stands unrivalled. It is soothing yet so stimulating that in the course of two Hours the system is thrown into a gentle perspiration and all pain or soreness is rapidly removed. In fresh wounds the flesh being sound healing immediately takes place. In old and corrupt sores the ointment removes the cause and nature heals. In the bites of man, dog, snake and Spider I have ample evidence of its efficacy. And in all the diseases for which it is recommended its virtue has been tested under my own superintendance: and in support of it I stake my reputation. A specimen of the oil cloth on which it should be applied accompanying these directions. which may be cleansed and redressed for a month should a case require treatment for so long a time — Note. The oils may be stirred with a paddle.

Witnesses
Robert Pone
Jno J Binford

William Walter Gray
Richmond June 15th 1833

Exd. W.G.C.

(1469 words)